(12) United States Patent
Frank et al.

(10) Patent No.: US 7,330,512 B2
(45) Date of Patent: Feb. 12, 2008

(54) SYSTEM AND METHOD FOR THE DATA TRANSMISSION OF DIGITAL TRANSMISSION DATA

(75) Inventors: Andre Frank, Neuenhagen (DE); Volker Rissland, Marwitz (DE)

(73) Assignee: Siemens Aktiengesellschaft, Munich (DE)

( * ) Notice: Subject to any disclaimer, the term of this patent is extended or adjusted under 35 U.S.C. 154(b) by 761 days.

(21) Appl. No.: 10/450,409

(22) PCT Filed: Dec. 12, 2001

(86) PCT No.: PCT/DE01/04772

§ 371 (c)(1), (2), (4) Date: Jun. 13, 2003

(87) PCT Pub. No.: WO02/49176

PCT Pub. Date: Jun. 20, 2002

(65) Prior Publication Data

US 2004/0057527 A1    Mar. 25, 2004

(30) Foreign Application Priority Data

Dec. 13, 2000 (DE) ................................ 100 62 762

(51) Int. Cl.
*H04B 3/00* (2006.01)
*H04L 25/00* (2006.01)

(52) U.S. Cl. ...................... 375/257; 375/222; 375/219; 375/220

(58) Field of Classification Search ................ 375/259, 375/222, 219, 220, 257; 370/229, 201, 286; 379/417; 340/644

See application file for complete search history.

(56) References Cited

U.S. PATENT DOCUMENTS 4,528,677 A    7/1985 Ise et al.

(Continued)

FOREIGN PATENT DOCUMENTS

EP    0 222 682 A1    5/1987

(Continued)

OTHER PUBLICATIONS

Siemens User's Manual, "IC's for Communications" ISDN Echocancellation Circuit, IEC-Q, PEB 2091, Version 4.3., Siemens AG, unknown date.

*Primary Examiner*—Phuong Phu
(74) *Attorney, Agent, or Firm*—Laurence A. Greenberg; Werner H. Stemer; Ralph E. Locher

(57) ABSTRACT

The invention relates to a system for the data transmission of digital transmission data (17, 18) between a first digital protective device (1) and a second digital protective device (9) on a section (A) of an energy supply line (2) in a transmission direction (15) and in a reception direction (16). The first digital protective device (1) is connected to an end (6) of an electrical data transmission line (7) via a first coupling device (5). The second digital protective device (9) is connected to the other end (12) of the electrical data transmission line (7) via a second coupling device (11). In order to establish data transmission with little complication, the data transmission line (7) is one-paired, and both coupling devices (5, 11) are adapted to enable transmission of digital transmission data in the transmission and reception direction (15 or 16) on the one-paired data transmission line (7) in the manner of a digital telecommunication transmission. The invention further relates to a method for transmitting data.

14 Claims, 3 Drawing Sheets

U.S. PATENT DOCUMENTS

| | | | |
|---|---|---|---|
| 4,964,118 A | 10/1990 | Aly et al. | |
| 5,970,088 A * | 10/1999 | Chen | 375/222 |
| 6,011,480 A * | 1/2000 | Schweitzer et al. | 340/644 |
| 6,282,204 B1 * | 8/2001 | Balatoni et al. | 370/421 |
| 6,370,187 B1 * | 4/2002 | Agah | 375/219 |
| 6,426,963 B1 * | 7/2002 | Kim | 370/524 |
| 6,496,342 B1 * | 12/2002 | Horvath et al. | 361/65 |
| 6,678,318 B1 * | 1/2004 | Lai | 375/232 |
| 6,891,887 B1 * | 5/2005 | Dobson | 375/220 |

FOREIGN PATENT DOCUMENTS

| | | |
|---|---|---|
| EP | 0 691 796 A2 | 3/1995 |
| EP | 0 806 852 A2 | 5/1997 |

\* cited by examiner

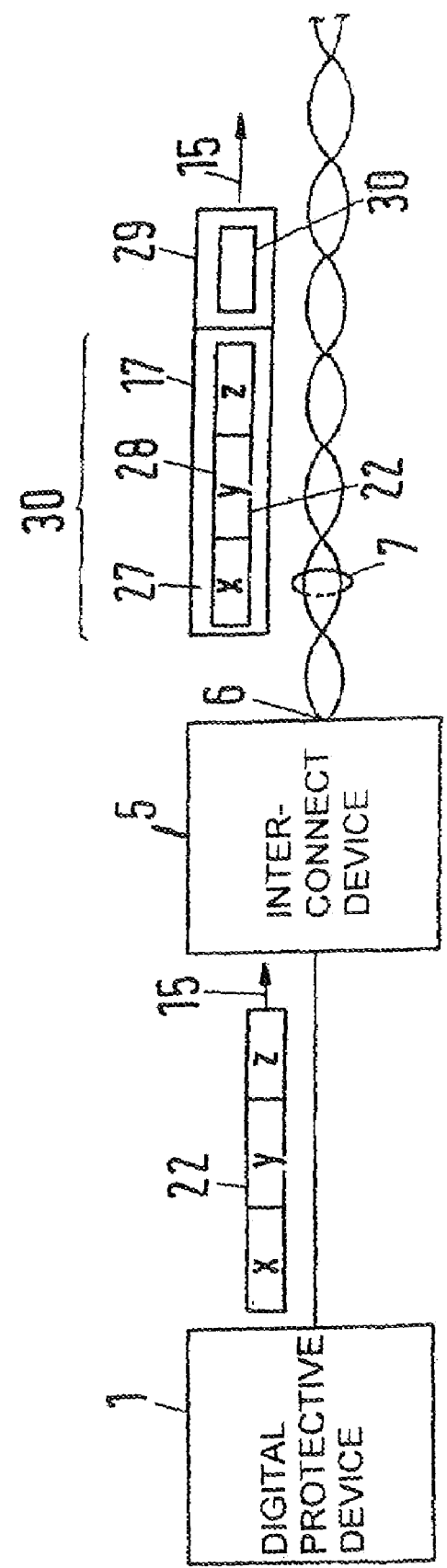

US 7,330,512 B2

SYSTEM AND METHOD FOR THE DATA TRANSMISSION OF DIGITAL TRANSMISSION DATA

This application claims priority to Application No. 1006276.5 which was filed in the German language on Dec. 12, 2001.

TECHNICAL FIELD OF THE INVENTION

The invention relates to an arrangement for the data transmission of digital transmission, and in particular, to digital transmission of data between a first digital protective device and a second digital protective device.

BACKGROUND OF THE INVENTION

"Leitungs-Differentialschutzeinrichtung PQ 741" [Line differential protective device PQ 741], FIG. 7, page 11 from the company Alstom (retrievable under "datasheet (6)" in German, file name "PQ741_06_05511GR.pdf" at "http://www.tde.alstom.com/pc/bases/gr/products.nsf/e47708d69e62a70480256816003800f3/372f6914871f304bc1256841002cdaa1?OpenDocument") discloses a first digital protective device arranged at the end of a first section of an electrical power transmission line. At the other end of the section of the electrical power supply line, a second digital protective device is provided. The two protective devices form differential protection for monitoring the section for a fault. To perform the differential protection function, the two protective devices are connected to one another for the purpose of data transmission. To this end, the first digital protective device is connected to one end of a two-pair electrical data transmission linevia an interconnect device. The other end of the two-pair electrical data transmission line has the second digital protective device connected to it via a second interconnect device. Data are transmitted between the two interconnect devices on the basis of a special data transmission protocol. In this context, the two interconnect devices are designed specifically for digital data transmission between the two protective devices via the electrical data transmission line. This involves transmitting digital data from the first interconnect device in the direction of the second interconnect device using one pair of the electrical data transmission line. For digital data transmission from the second interconnect device to the first interconnect device, the other pair of the electrical data transmission line is provided. The respective specific design of the interconnect devices allows data transmission between the two interconnect devices on the two-pair, electrical data transmission line over a data transmission line length of up to 15 km.

SUMMARY OF THE INVENTION

The invention relates to an arrangement for the data transmission of digital transmission data between a first digital protective device and a second digital protective device on a section of a power supply line in a transmission direction and in a reception direction, the first digital protective device being connected to one end of an electrical data transmission line via a first interconnect device, and the second protective device being connected to the other end of the electrical data transmission line via a second interconnect device.

The invention discloses an arrangement of the type mentioned in the introduction which allows data transmission with comparatively little involvement.

In one embodiment of the invention, there is an arrangement of the type mentioned in the introduction by virtue of the electrical data transmission line being a single-pair line, and by virtue of the two interconnect devices being in a form such that it is possible to transmit between them digital transmission data in the transmission and reception directions on the single-pair data transmission line in the manner of digital telecommunication data transmission between, firstly, a digital network terminating device on a digital subscriber terminalin a digital telecommunication network and, secondly, a digital line terminating device, connected to the digital network terminating device via an electrical subscriber line, in a digital switching center in the digital telecommunication network.

Such telecommunication data transmissions are described, by way of example, in Gerd Siegmund "Technik der Netze" [Network Technology], Heidelberg, 1999, ISBN 3-7785-2637-5, subsequently referred to as "Technik der Netze".

The design of the electrical data transmission line as a single-pair line saves a pair in comparison with the data transmission line based on the prior art. This alone provides a considerable reduction in complexity as compared with the prior art. Since, in addition, the interconnect devices are in a form such that it is possible to transmit between them digital transmission data in the transmission and reception directions on the single-pair data transmission line in the manner of digital telecommunication data transmission between, firstly, a digital network terminating device on a digital subscriber terminal in a digital telecommunication network and, secondly, a digital line terminating device, connected to the digital network terminating device via an electrical subscriber line, in a digital switching center in the digital telecommunication network, the interconnect devices can be designed to have standard modules which are used for this purpose in telecommunication networks and are inexpensive and reliable as a result of the widespread nature of digital telecommunication, which means that the interconnect devices in the inventive arrangement can be produced much more cheaply than the interconnect devices based on the prior art. All in all, there is thus a considerable reduction in involvement for the inventive arrangement as compared with the prior art.

In one aspect of the invention, data are transmitted between the two interconnect devices via the single-pair electrical data transmission line both in the transmission direction and in the reception direction. That is, from the first interconnect device to the second interconnect device and vice versa. In order to separate the transmission data transmitted in the transmission direction from the transmission data received in the reception direction during this process, two methods, which are basically known per se, can advantageously be used with interconnect devices of appropriate design. First, the two interconnect devices can each send and receive alternately as appropriate, which means that there is no simultaneous transmission from the first interconnect device to the second interconnect device and vice versa. In this context, the two interconnect devices need to alternate sending and receiving very quickly over time so that unimpaired data transmission via the single-pair electrical data transmission line is possible. This method is also referred to as a time-division method or "Ping-Pong method". To carry out this method, the interconnect devices have appropriate means for sending and receiving at successive times; these means are known per se.

The second method is the "echo cancelation method", which involves simultaneous sending and receiving on the single-pair data transmission line. To carry out this method, each interconnect device has means for separating the transmission data sent in the transmission direction from the transmission data transmitted in the reception direction, means for echo cancellation of transmission data echoes arising from the data transmission line, and means for scrambling the digital transmission data to be transmitted. The means for separating the transmission direction and the reception direction are known by the term hybrid circuit, for example. In order to use the means for separating the transmission and reception directions to cancel any transmission data echoes possibly arising on the data transmission line, means for echo cancellation are additionally provided. Since a significant feature of echo cancellation is that the transmission data to be transmitted in the transmission direction are statistically independent of the transmission data received in the reception direction, the means for scrambling are provided, the means being used for specifically altering ("scrambling") the order, for example, of the data to be transmitted as transmission data such that the transmission data received in the reception direction are statistically independent. In this context, the two interconnect devices agree on their respective type of "scrambling" or have been pre-set accordingly. The means for separating the transmission data sent in the transmission direction from the transmission data transmitted in the reception direction, the means for echo cancellation and the means for scrambling and data reduction are known from the prior art, for example "Technik der Netze", page 404 under the heading "Richtungstrennungsverfahren" [Methods of direction separation]. The provision of these means allows digital data to be transmitted both in the transmission direction and in the reception direction simultaneously, so that no waiting times arise, as occur between transmission and reception using the time-division method.

Preferably, the interconnect devices have means for data reduction for the digital transmission data which are to be transmitted. The means for data reduction allow the data transmission rate to be increased, so that transmission via the electrical single-pair data transmission line can take place at a higher data transmission rate.

Preferably, the means for echo cancellation have an adaptive transverse filter. Such an adaptive transverse filter is known from "Technik der Netze", page 406, for example. The advantage of such an adaptive transverse filter is that it can be automatically aligned with the individual physical circumstances of the single-pair electrical data transmission line for the purpose of echo cancellation.

Preferably, the interconnect devices each have a U interface to which the single-pair data transmission line is connected. The U interface is a commonly used and standardized digital data transmission interface for a digital telecommunication network. It is described in "Technik der Netze", page 403 ff, for example. In Deutsche Telekom's telecommunication network, the U interface is also called the $U_{k0}$ interface.

Preferably, the interconnect devices each have an ISDN module with an IOM2 interface and an output interface, the IOM2 interface being connected to the respective digital protective device, and the output interface being connected to the single-pair data transmission line.

Such an ISDN module is a commercially available module which is appropriately inexpensive. As a result, low costs are incurred for designing the interconnect devices. An example of such a module is the PEB 2091 from Siemens AG or from Infineon AG (cf. user's manual "ICs for Communications, ISDN Echo cancellation Circuit, IEC-Q, PEB 2091, Version 4.3", 02.95). The IOM2 interface ("extended ISDN oriented modular" interface) is known generally from ISDN technology and also from the aforementioned user's manual.

The data transmitted between the digital protective device and the associated interconnect device (protective device data) can be coded, by way of example, on the basis of a special data transmission protocol, particularly the HDLC protocol. For transmission on the data transmission line, these data are converted into the transmission data using the ISDN interface module. To this end, the protective device data are supplied to the ISDN interface module's IOM2 interface. In this context, it is firstly possible for the protective device data to be converted by their own data transmission protocol specifically into data which are in line with the IOM2 interface's IOM2 protocol. For such conversion, a conversion module is normally required. The ISDN module converts these data applied to the IOM2 interface into the transmission data. Preferably, however, the digital protective devices are connected directly to the IOM2 interface. The protective device data are supplied to the IOM2 interface as data which are to be transmitted. In this context, the protective device data are not converted in terms of their data transmission protocol, but rather the protective device data are treated overall in the manner in which pure user data transmitted between a network terminating device and a line terminating device are ordinarily treated. In other words: the protective device data are left in their coded form and are treated as user data which are to be transmitted, and are converted into transmission data via the ISDN interface module without prior recoding.

Preferably, the single-pair data transmission line is provided in parallel with the section of the power supply line. In the arrangement for data transmission, it is thus possible to use, by way of example, an already present data transmission line provided in parallel with the section of the power supply line.

The invention also relates to a method for transmitting digital transmission data.

Such a method for transmitting digital transmission data is likewise known from Alstom's product specification already mentioned in the introduction. In this context, the transmission data to be transmitted between two interconnect devices are coded on the basis of a special data transmission protocol. For the transmission direction and the reception direction, this involves the use of a respective dedicated transmission path, in each case formed using one pair of a two-pair data transmission line.

In another embodiment of the invention, there is a method for transmitting transmission data which allows the transmission data to be transmitted with comparatively little involvement.

The method includes, for example, transmitting transmission data in a transmission direction and a reception direction between a first digital protective device and a second digital protective device which are arranged apart from one another and on a section of a power supply line and which are connected via a respective associated interconnect device to one respective end of a single-pair electrical data transmission line, the transmission data being transmitted between the interconnect devices in the transmission and reception directions on the single-pair data transmission line in the manner of digital telecommunication data transmission between, firstly, a digital network terminating device on a digital subscriber terminal in a digital telecommunication network and, secondly, a digital line terminating device, connected to the digital network terminating device via an electrical subscriber line, in a digital switching center in the digital telecommunication network.

By virtue of data being transmitted between the interconnect devices in the transmission and reception directions in the manner of digital telecommunication data transmission between, firstly, a digital network terminating device on a digital subscriber terminal in a digital telecommunication network and, secondly, a digital line terminating device, connected to the digital network terminating device via an electrical subscriber line, in a digital switching center in the digital telecommunication network, it is firstly possible for data to be transmitted via a single-pair data transmission line, and secondly ordinary components in widespread use in telecommunication technology can be used for the interconnect devices for the purpose of carrying out the method, which means that comparatively inexpensive data transmission is made possible between the two interconnect devices. This also means that the involvement in terms of the method is significantly reduced, because it saves a transmission path and does not use a special data transmission protocol, but rather a reliable method which is ordinary and therefore simple to use.

Preferably, the data transmission between the two interconnect devices involves a time-division method being carried out in order to separate the transmission direction from the reception direction. This allows the transmission data sent in the transmission direction to be separated from the transmission data sent in the reception direction particularly easily.

With particular preference, however, the data transmission between the two interconnect devices involves the transmission direction being separated from the reception direction in each of the interconnect devices on the basis of the echo cancellation method, a scrambling method being carried out to produce the statistical independence of the transmission data to be transmitted in the transmission direction with respect to the transmission data transmitted in the reception direction. These methods are well known from digital telecommunication technology, for example "Technik der Netze", page 404. By using these methods, transmission data can be transmitted both in the transmission direction and in the reception direction simultaneously.

Preferably, a coding/decoding method is carried out during data transmission for the purpose of data reduction. This allows the data transmission rate between the two interconnect devices to be significantly increased.

For the purpose of data reduction, a multiplicity of methods are known. Preferably, the coding/decoding method used is the 2B/1Q method or the 4B/3T method. These are methods customary in telecommunication technology and are indicated, by way of example, from Technik der Netze, page 406 under the heading "Der Übertragungscode" [The transmission code].

Preferably, the transmission method carried out is an ISDN data transmission method using at least one user channel. This ISDN transmission method using a user channel is also a popular data transmission method, which is therefore simple to use, and is known from Technik der Netze, page 377 ff.

Preferably, the protective device data to be transmitted between the first digital protective device and the second digital protective device are transmitted in the user channel as user data. This means that it is not necessary to perform any conversion of the data transmitted between the interconnect device and the respective associated protective device for the data transmission protocol used, but rather these data are transmitted as transmission data in the user channel without any further conversion.

BRIEF DESCRIPTION OF THE DRAWINGS

For the purpose of further explanation, the invention is explained using an exemplary embodiments in the drawings, in which:

FIG. 3 shows the data transmission between a protective device and an interconnect device.

DETAILED DESCRIPTION OF THE INVENTION

Figure 1:
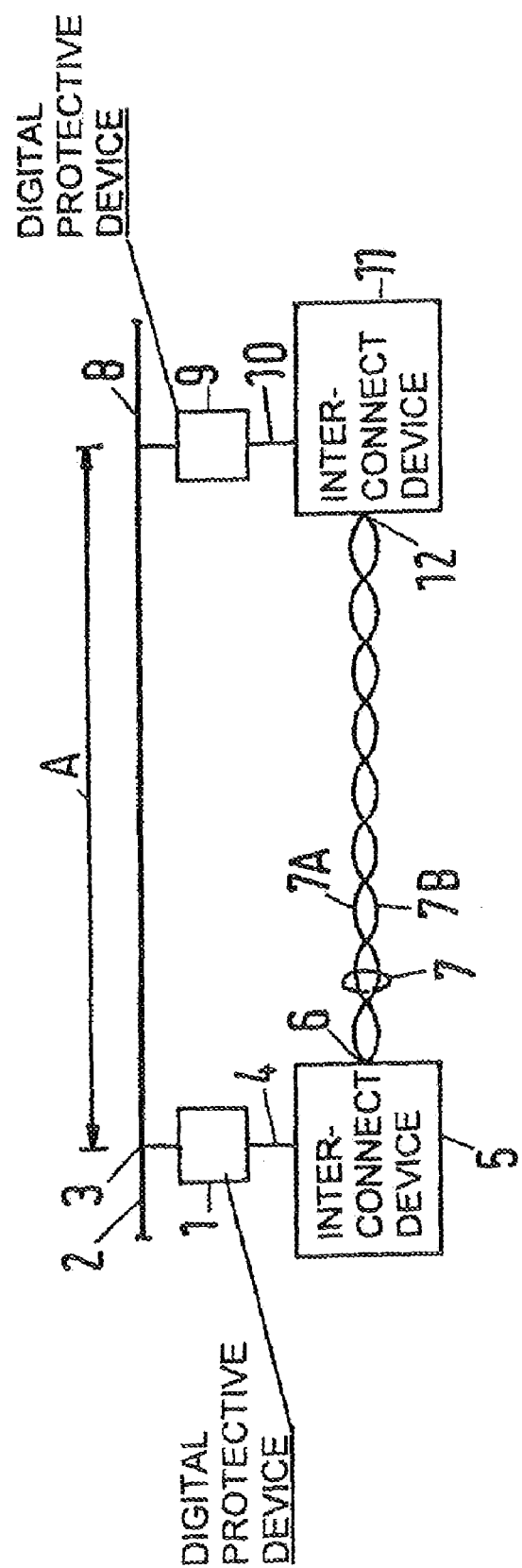
FIG. 1 shows an arrangement for data transmission between two digital protective devices.

The data transmission arrangement shown in FIG. 1 has a first digital protective device 1 which is arranged at one end 3 of a section A of an electrical power supply line 2. At the other end 8, there is a complementary second digital protective device 9. The two digital protective devices 1 and 9 can be in the form of differential protective devices, for example, and serve to monitor the section A of the electrical power supply line 2 for an electrical fault. To this end, the two protective devices 1 and 9 interchange protective data which serve to perform their monitoring function. For this purpose, the digital protective device 1 is connected to a first interconnect device 5 via a data line 4. The interconnect device 5 in turn is connected to one end 6 of an electrical data transmission line 7. The second digital protective device 9 is connected to a second interconnect device 11 via a further data line 10. The second interconnect device 11 is connected to the other end 12 of the electrical data transmission line 7. The electrical data transmission line 7 is of single-pair design, that is to say has one pair, formed from two electrically conductive wires 7A and 7B.

The data link formed by means of the data transmission line 7, the two interconnect devices 5 and 11 and the two data lines 4 and 10 is used to interchange the protective data between the two protective devices 1 and 9, for example for performing their protective and monitoring function for section A of the power supply line 2. Instead of one of the protective devices 1 or 9, a different reciprocal device, for example a personal computer, can also be provided which can be used for remote control or remote poling of the remaining protective device 1 or 9, for example.

The two data lines 4 and 10 can be in any form, for example in the form of an optical-fiber transmission link.

The two interconnect devices 5 and 11 are in a form such that it is possible to transmit between them digital transmission data 17 or 18 (see FIG. 2) in the transmission and reception directions on the single-pair data transmission line 7 in the manner of digital telecommunication data transmission between, firstly, a digital network terminating device on a digital subscriber terminal in a digital telecommunication network and, secondly, a digital line terminating device, connected to the digital network terminating device via an electrical subscriber line, in a digital switching center in the digital telecommunication network. The protective data to be interchanged between the protective devices 1 and 9 in order to perform their monitoring function are included in the transmission data 17 or 18 (see FIG. 2).

Such data transmission is performed, by way of example, in an ISDN telecommunication network and is known from "Technik der Netze", page 377 ff.

Figure 2:
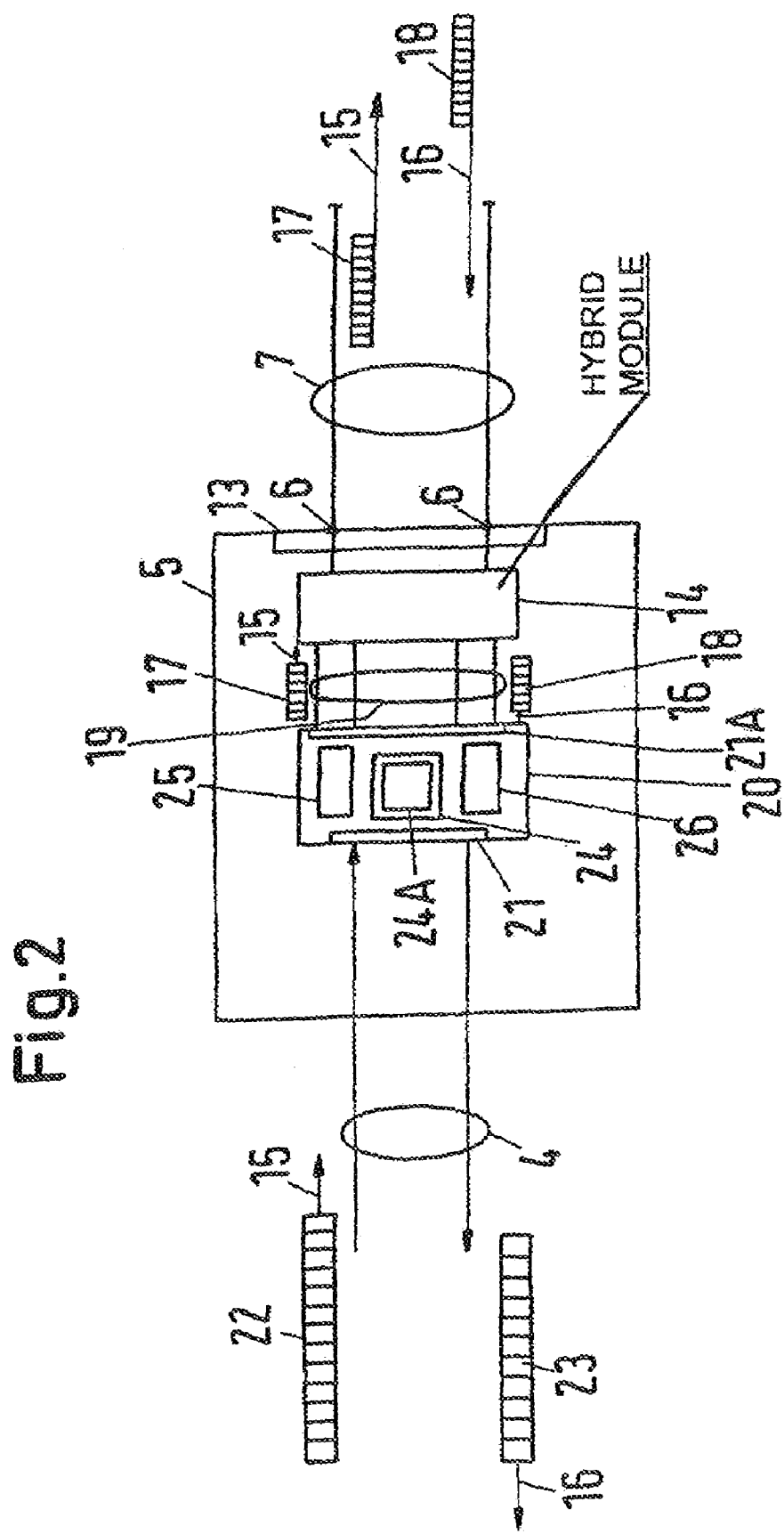
FIG. 2 shows an interconnect device.

FIG. 2 shows the interconnect device 5 as a representation of the two interconnect devices 5 and 11. The design thereof is based on the design of the interconnect device 11. The interconnect device 5 has a "U interface" 13 to which one end 6 of the single-pair electrical data transmission line 7 is connected. In addition, the interconnect device 5 has a hybrid module 14 which is connected to the U interface 13 and is used for separating digital transmission data 17 to be sent in the transmission direction 15 and transmission data 18 transmitted in the reception direction 16. The hybrid module 14 can be in the form of a hybrid circuit, for example. The hybrid module 14 is connected to an output interface 21A of an ISDN module 20 by means of a four-terminal connection 19.

The ISDN module 20 has an IOM2 interface 21 to which the data line 4 connecting the interconnect device 7 to the first digital protective device 1 (see FIG. 1) is connected. The data line 4 is used to transmit digital protective device data 22 which are to be transmitted to the IOM2 interface 21 in the transmission direction and protective device data 23 which are to be transmitted to the digital protective device 1 in the reception direction. The protective device data 22 and 23 can be coded on the basis of any data transmission protocol. However, it is important that they include, in any form, the protective data which are actually to be transmitted and are used for performance of the monitoring function by the protective devices 1 and 9.

The protective device data 22 are converted into transmission data 17 in line with the U interface specification (ISDN protocol) and are output to the hybrid module 14 for the purpose of transmission to the data transmission line 7. Similarly, the transmission data 18 received in the reception direction 16 are separated, in terms of their transmission direction, by the hybrid module 14 from the transmission data 17 which are to be sent in the transmission direction 15 and are supplied to the ISDN module 20. This module converts the transmission data 18 into the protective device data 23 and outputs them via its IOM2 interface 21 and via the data line 4 to the protective device 1.

For transmission between a protective device 1 or 9 and a digital reciprocal device instead of one of the protective devices 1 or 9, the actual data to be transmitted between the reciprocal device and the remaining protective device need to be disposed instead of the protective data.

The ISDN module 20 has means for echo cancellation 24 with an adaptive transverse filter 24a and also means for coding 25 (coding device) the protective device data 22, which are to be transmitted in the transmission direction 15, into transmission data 17, and means 26 for decoding (decoding device) transmission data 18, received in the reception direction 16, into the protective device data 23. The means for coding 25 are in a form such that they scramble the transmission data 17, in agreement with the corresponding coding device 25 in the interconnect device 11, such that they are statistically independent of the transmission data 18 received from the interconnect device 11 in the reception direction 16, so that particularly effective echo cancellation with the adaptive transverse filter 24A is made possible. This method is likewise known from the prior art, for example "Technik der Netze", page 404 "Richtungstrennungsverfahren" [Methods of direction separation]. Since the interconnect device 11 has also been used to perform appropriate "scrambling" of the transmission data 18, corresponding backward scrambling is performed by the decoding device 26 using the transmission data 18.

In addition, the coding device 25 and the decoding device 26 are in a form such that data reduction of the protective device data 22 to be transmitted in the transmission direction 15 is performed and such that corresponding expansion of the transmission data 18 received in the reception direction 16 is performed. This involves the use of the 2B/1Q method or the 4B/3T method known from the prior art. For backward scrambling or for coding/decoding, the present case simultaneously also involves proceeding such that the transmission data 17 or 18 are each free of direct components; this likewise involves the use of popular methods. This is addressed in "Technik der Netze", page 406. It is naturally possible for scrambling/backward scrambling, coding/decoding and production of a state without any DC level to be performed in respectively individual, mutually isolated units of the interconnect device 5 or of the ISDN module 20. During data transmission between the interconnect devices 5 and 11, the transmission method preferably used is an ISDN data transmission method using at least one user channel 27. Conversion of the protective device data 22, transmitted by the digital protective device 1, into the transmission data 17 is illustrated in this regard with reference to FIG. 3. The protective device data 23 transmitted by the second protective device 9 are converted in a similar manner to this. The digital protective device data 22 are supplied, for conversion, to the IOM2 interface 21 of the ISDN module 20 (see FIG. 2) and are arranged in the user channel 27 as user data 28 without further recoding.

Another option for converting the protective device data 22 into the transmission data 17 is for the protective device data 22 coded on the basis of their transmission protocol first to be fully decoded in order to obtain the protective data they include. For the purpose of transmission, these protective data are then applied to the IOM2 interface 21 as data to be transmitted and are arranged in the user channel 27 as user data 28. To decode the protective device data 22, this would require a corresponding conversion module which would need to be connected upstream of the IOM2 interface 21 of the ISDN module 20. Accordingly, the protective data output by the IOM2 interface 21 would first need to be converted to the protective device data 23 on the basis of the transmission protocol provided therefore. However, the direct arrangement of the protective device data 22 in the user channel 27 as user data 28, as shown in FIG. 3, means that such recoding is not necessary, and hence conversion modules are not necessary either.

In the present case, the transmission data 17 are shown as a single data packet 29 which is customary in ISDN data transmission technology, the digital protective device data 22 being of such a length that they can be arranged entirely in that part 30 of the data packet 29 which is reserved for the user channel 28. Naturally, during continuous data transmission, digital protective device data 22 are split over a plurality of data packets 29, and each of the data packets 29 is respectively transmitted in the data part 30 reserved for the user channel 27. In addition, it should be noted that normally data packets 29 having two data areas for two user channels are provided for ISDN data transmission technology. It is naturally then possible for digital protective device data 22 to be split over the two user channels. The data packet 29 likewise naturally includes an area for transmitting control and signalling information 30, such information being customary for such digital data transmission.

The transmission data 17 or 18 can be transmitted at a data transmission rate of 160 kbit/s, for example. Depending on the conductor property of the individual conductors in the pair, the data transmission line 7 can have a length of greater than 7 km.

The invention claimed is:

1. An arrangement for the data transmission of digital transmission data between a first digital protective device and a second digital protective device on a section of a power supply line in a transmission direction and in a reception direction, the first digital protective device being connected to one end of an electrical single-pair data transmission line via a first interconnect device, and the second digital protective device being connected to another end of the electrical single-pair data transmission line via a second interconnect device, wherein
   for enabling the data transmission of digital transmission data in the transmission and reception directions, the interconnect devices each contain an ISDN module with an IOM2 interface and an output interface, the IOM2 interface being connected to a respective digital protective device, and the output interface being connected to the single pair data transmission line, and wherein
   the digital transmission data is transmitted between the interconnect devices in a manner of digital telecommunication data being transmitted in a digital telecommunication network between a digital network terminating device on a digital subscriber terminal and a digital line terminating device in a digital switching center.

2. The arrangement of claim 1, wherein each interconnect device comprises means for separating the transmission data sent in the transmission direction from the transmission data transmitted in the reception direction, means for echo cancellation of transmission data echoes arising on the data transmission line, and means for scrambling the digital transmission data to be transmitted.

3. The arrangement of claim 1, wherein the interconnect devices comprise means for data reduction for the digital transmission data to be transmitted.

4. The arrangement of claim 2, wherein the means for echo cancellation have an adaptive transverse filter.

5. The arrangement of claim 1, wherein the interconnect devices each have a U interface to which the single-pair data transmission line is connected.

6. The arrangement of claim 1, wherein the digital protective devices are each connected directly to the respective IOM2 interface.

7. The arrangement of claim 1, wherein the single-pair data transmission line is provided in parallel with the section of the power supply line.

8. A method for transmitting transmission data in a transmission direction and a reception direction between a first digital protective device and a second digital protective device which are arranged apart from one another and on a section of a power supply line and which are connected via a first interconnect device and a second interconnect device respectively to respective ends of a single-pair data transmission line,
   wherein, for enabling the data transmission of digital transmission data in the transmission and reception directions, the interconnect devices each contain an ISDN module with an IOM2 interface and an output interface, the IOM2 interface being connected to respective digital protective device, and the output interface being connected to the single pair data transmission line, and wherein
   the digital transmission data is transmitted between the interconnect devices in a manner of digital telecommunication data being transmitted in a digital telecommunication network between a digital network terminating device on a digital subscriber terminal and a digital line terminating device in a digital switching center.

9. The method of claim 8, wherein the data transmission between the two interconnect devices involves a time-division method being carried out in order to separate the transmission direction from the reception direction.

10. The method of claim 8, wherein the data transmission between the two interconnect devices involves the transmission direction being separated from the reception direction in each of the interconnect devices on the basis of the echo cancellation method, a scrambling method being carried out to produce the statistical independence of the transmission data to be transmitted in the transmission direction with respect to the transmission data transmitting in the reception direction.

11. The method of claim 8, wherein a coding/decoding method is carried out data transmission for the purpose of data reduction.

12. The method of claim 11, wherein the coding/decoding method used is the 2B/1 Q method or the 4B/3T method.

13. The method of claim 9, wherein
   the transmission method used is an ISDN data transmission method using at least one user channel.

14. The method of claim 13, wherein the protective device data to be transmitted between the first digital protective device and the second digital protective device are transmitted as user data in the user channel.

* * * * *